United States Patent

[11] 3,603,633

[72] Inventor Cheston Lee Eshelman
621 N.E. 30 Terrace, Miami, Fla. 33137
[21] Appl. No. 848,903
[22] Filed Aug. 11, 1969
[45] Patented Sept. 7, 1971
Continuation-in-part of application Ser. No. 748,785, July 30, 1968, now Patent No. 3,502,362.

[54] SHOCK-ABSORBING TIRE BUFFER
6 Claims, 7 Drawing Figs.

[52] U.S. Cl. ................................................ 293/19,
224/42.04, 293/69, 293/89, 293/71
[51] Int. Cl. .............................................. B60r 19/10,
B61f 19/04, B61q 11/12
[50] Field of Search ........................................... 224/42.04;
293/19, 69, 71, 89

[56] References Cited
UNITED STATES PATENTS

| | | | |
|---|---|---|---|
| 1,672,335 | 6/1928 | O'Meara | 293/71 X (P) |
| 2,196,225 | 4/1940 | Morrison | 224/42.04 |
| 2,358,481 | 9/1944 | Slack | 224/42.04 |
| 2,603,527 | 7/1952 | Perkins | 293/69 X |
| 2,935,330 | 5/1960 | Millman | 293/19 X |
| 3,074,751 | 1/1963 | Gerin | 293/19 |
| 3,140,111 | 7/1964 | Dabroski | 293/19 X |
| 3,502,362 | 3/1970 | Eshelman | 293/19 |

Primary Examiner—Arthur L. La Point
Assistant Examiner—Howard Beltran

ABSTRACT: In an automotive highway vehicle, a frame, a transverse structure rigidly connected across the front end of the frame, said structure including a first rigid transverse member having a forwardly facing recess and a second rigid transverse member which also extends forwardly of the first member; a plate mounted on the second member, an elongated slot in the plate, a hub mounted on the plate with means permitting it to slide thereon the length of the slot; a spare wheel and tire mounted substantially horizontally on the hub with the rear portion of the tire nested in the recess.

PATENTED SEP 7 1971 3,603,633

INVENTOR
Cheston Lee Eshelman

INVENTOR
Cheston Lee Eshelman

SHOCK-ABSORBING TIRE BUFFER

This application is a continuation-in-part of my copending application Ser. No. 748,785, filed July 30, 1968, now U.S. Pat. No. 3,502,362, issued Mar. 24, 1970.

My invention relates to an improvement in a spare absorber which utilizes a dormant part of the motor vehicle, the spare tire and wheel, to absorb the shock of a front end collision. The tire and wheel are mounted substantially horizontally to the front of the vehicle or having some dihedral to prevent under-riding high cars on collision. Thus the spare absorber offers "crash-worthiness," helps protect the occupants from death and injury, and prevents damage to the front of the vehicle and the vehicle it strikes, while remaining readily available as a spare tire and wheel.

With the ever-increasing use of express highways and the high cruising speed of modern automobiles plus the increased number of vehicles on the roads, and bumper to bumper driving, there is a steady increase in traffic collisions with many deaths and serious injuries and costly damage to the cars due to collision with barrier or head-on collision into an oncoming vehicle or rear end collision into a stopped car. One can hardly read a newspaper or watch the news on television without learning of a head-on collision of an automobile resulting in fatalities and injuries.

With all the improvements being made in modern passenger automobiles, trucks, busses and station wagons, including the engines and bodies, the bumpers have been neglected by the industry. The modern bumper remains in large measure an ornamental feature rather than what its name implies. A collision of more than 3 m.p.h. will distort of dent the modern bumper.

It is the object of my invention to supply a front end absorption device which I have named the "Spare Absorber" to provide absorption of energy to a degree not possible in a pressed steel, chrome plated bumper.

It is further an object of my invention that my device shall be usable on small, medium and large automobiles, trucks, busses, station wagons and motorcycles. It is still another object of my invention that the device may be provided on vehicles either at the time of manufacture or later by the purchaser thereof.

The standard pneumatic tire and pressed steel wheel are very rugged and will resist being compressed out of their round shape. In most serious accidents, where the vehicle body is smashed out of shape and the engine is torn from the body mounts, the spare tire and wheel are not damaged, not are the wheels on the vehicle. Even in airplane crashes, where the debris is scattered over a large area, the wheels and tires remain in good condition.

To carry out those object the spare tire and wheel are mounted up front of the vehicle, in front of the engine and radiator space, in a plane substantially horizontal to the road, with the rear of the tire nesting in a recess in a transverse member at approximately the height of the vehicle frame, and the front of the wheel extending forward or tilted slightly upward.

The spare tire and wheel are supported on a longitudinal support frame, which is an extension of the vehicle frame proper. At the front top of said extended frame there is provided an elevated, slotted base plate that has a sliding hub with means of mounting the wheel to the top side of the hub, and the bottom side of the hub, having a flat surface to slide on the flat surface of the base plate. The hub is held in place by a king pin that travels in the slot-in-plate, and at the rear portion of the tire, when the spare is mounted on the support frame, there is provided a rigid cross frame member with a recessed nesting support for the tire to nest in. The purpose of this arrangement is to allow the wheel to move aft upon impact, against the rear of the tire, and against the rigid cross frame and nesting support, a restricted distance equal to the profile of the tire, or the length of the slot, whichever is the lesser, thereby utilizing both the front and rear absorption values of the tire rubber, tire cord, and compressed air at the same time.

In the interest of design and appearance the bumpers and adjacent ornamental structure are blended and curved from the outside front corners of the vehicle body to the forward periphery of the tread of the spare tire. My device is to be located at the front of all vehicles regardless of their type. Those cars that have the radiator and/or engine at the rear, or no radiator at all, are considered to be the same as conventional cars that have the radiator and engine located in front. Where there is no longitudinal frame as on monocoque bodies, the body is to be considered the same as the frame by fastening the support structure and mechanism to the hard points of the body. The slotted aperture is meant to include any other means of a sliding track that will allow the wheel to move back on impact.

The wheel is mounted in the described said position to put it between the car and any barrier with which it may collide. There are between 26 and 29 inches of absorption material contained in the wheel, consisting, from fore to aft, of a layer of rubber and cord, a layer of compressed air, a pressed steel wheel, another layer of compressed air, and another layer of rubber and cord, all of which must be collapsed before the struck object can reach the radiator and engine of the vehicle.

The advantages of this thickness of absorption materials are obvious in absorbing the energy and decelerating the vehicle, in reducing fatalities, serious injuries and property damage by an estimated 50 percent. Tests have shown that a car can drive head-on into a concrete wall at 40 miles per hour and not break the headlights.

An engineering analysis made by one of America's largest defense plants shows that the spare tire and wheel reduce fatalities by 50 percent in front collisions, when mounted as a spare absorber. The spare absorber does not interfere with the driving or performance of the car or with the cooling, and does not interfere with parking, because backing into a parallel parking space is usually done at the same angle in the front as the front of the Spare Absorber is to the edge of the car. The front wheels cannot be turned sharp enough to touch the Spare Absorber.

Reference is made to other efforts to utilize the spare tire in some manner as a safety device, but none have proved as effective or as conveniently arranged as the device herein described. In fact they show the spare tire carried within the body where is would normally be in the way of the engine and radiator whereby these and other important components would have to be relocated. Such an arrangement also results in difficulty in removing the spare tire and wheel for their normally intended use.

For further comprehension of the invention reference may be had to the accompanying drawings wherein.

Figure 1:
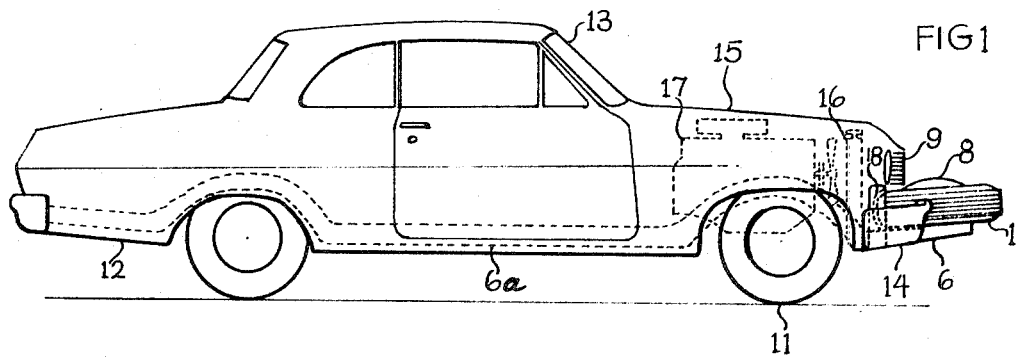
FIG. 1 is a side plan view of the complete car showing the spare tire and wheel in position in front of the vehicle.
Figure 2:
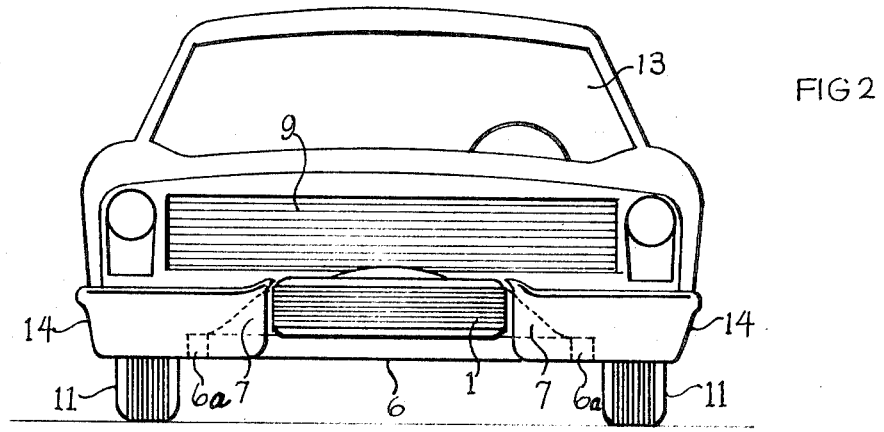
FIG. 2 is a front plan view of the complete car showing the spare tire and wheel in position in front of the vehicle.
Figure 3:
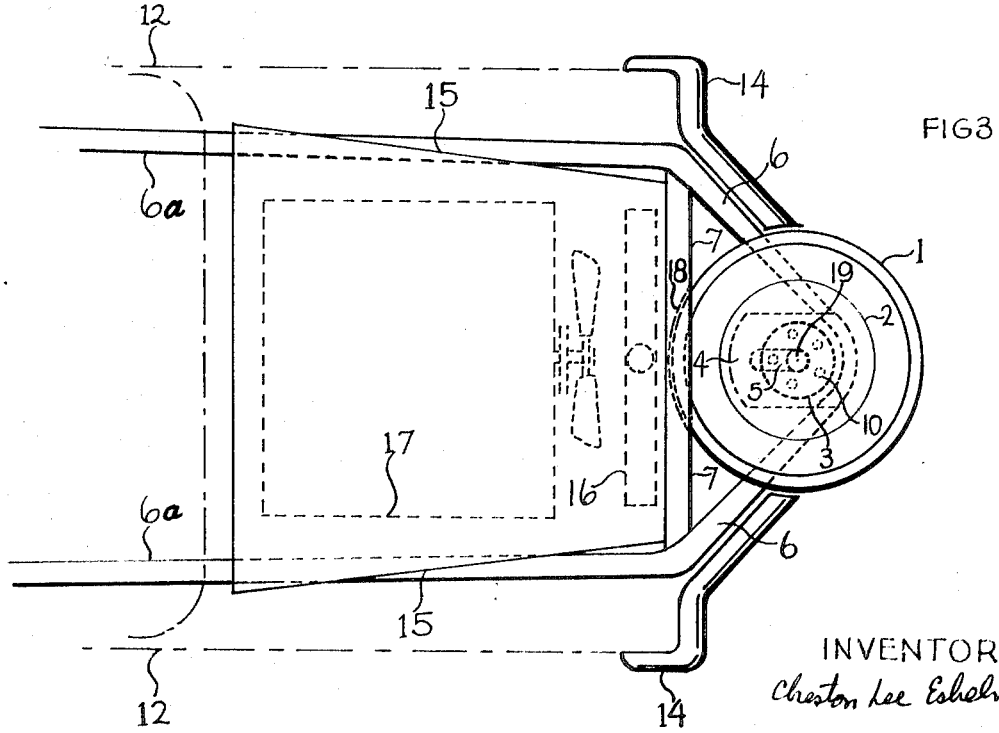
FIG. 3 is a top plan view of the complete car showing the spare tire and wheel in position in front of the vehicle.
Figure 3A:
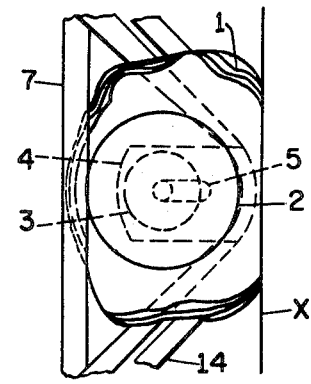
FIG. 3A is a simplified view showing the position of the wheel and the distortion of the tire upon a collision with an obstruction X.
Figure 4:
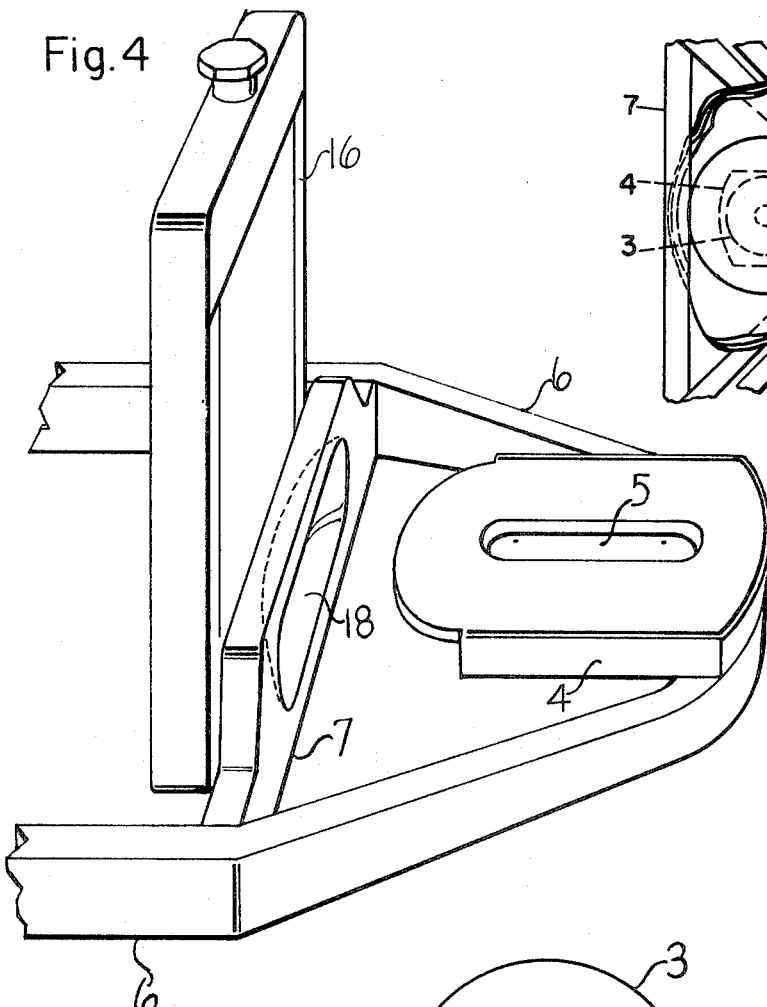
FIG. 4 is a ¾ front perspective view showing the extended longitudinal frame and the cross frame with the support, and the elevated slotted baseplate.
Figure 5:
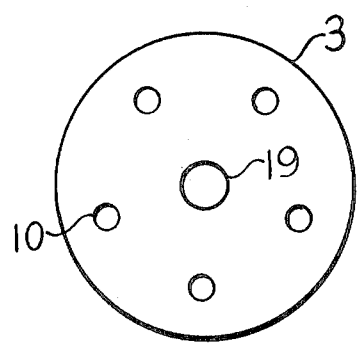
FIG. 5 is a top plan view of the sliding hub showing the wheel fasteners.
Figure 6:
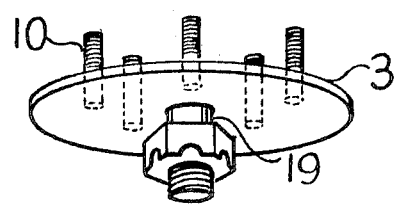
FIG. 6 is a side plan view of the sliding hub s owing the kingpin.

FIGS. 1–3 show the spare tire 2 front of the radiator 16 and engine 17 substantially parallel to the road at about the height of, or above, bumper level. The spare is carried by a support frame 6, which is an extension of the longitudinal vehicle frame 6a. Arranged transversely of the vehicle in front of the radiator and rigidly connected at its ends to the vehicle frame 6a, there is a cross frame member 7 which has a front facing recess or nesting support 18. On the front top side of the extended frame 6 there is secured, as by welding or the like, a slotted or apertured baseplate 4. A slidable hub 3 with a downwardly extending kingpin 19 lies on top of baseplate 4 with the kingpin extending through the slot or aperture 5. The hub 3 is provided to carry the spare tire and wheel 1,2 and is fitted with stud bolts 10 for securing the wheel to the hub. The hub when mounted on the base plate 4 is slidable thereon a distance equal to the length of the slot upon a collision with an obstruction X, as seen in FIG. 3A. The heights of the frame 6, plate 5, hub 3, member 7, and recess 18 above the roadway, and the horizontal distance between the recess 18 and the slot 5, are all so arranged that when the spare 1,2 is mounted on the hub 3 and the kingpin is all the way forward in the slot 5, the rear portion of the inflated tire will nest in the recess 18.

In the described construction, the recess 18, backed by the cross member 7, acts to hold the spare in its described position. On striking an obstruction in front, however, the spare acts as a shock absorber or buffer. As shown in FIG. 3A, at the moment of collision the wheel is forced to slide backward, with the hub, up to the limit allowed by the slot. The tire, being nested in the recess, cannot move back so it is subjected to substantial compression resulting in distortion.

The front bumpers 14 blend and curve into each side of the outer center circumference of the tire tread and each side of the car body corner edges 12. The grill 9 is shaped and styled around the rear portion of the spare tire 1 in a manner to allow removing the spare tire and wheel. The hood lid 15, the windshield 13, and the front wheels 11 are all to the rear of the spare absorber and the wheel cover 8.

Although one form of the invention has been illustrated and described, the specific terms employed are used in a generic and descriptive sense only and not for purpose of limitation, the scope of the invention being defined by the claims.

Having thus described my invention, I claim:

1. In an automotive highway vehicle having a front end, a longitudinal frame, a rigid cross frame including a nesting support on the front end of the longitudinal frame and mans for reducing the severity of a collision of the vehicle with an object in front of it comprising:
   a vehicle wheel with a pneumatic tire mounted thereon,
   b. said wheel and tire being positioned substantially parallel to the highway surface forwardly of the nesting support and with said tire in close proximity to said support,
   c. the front portion of the tire extending forwardly of other vehicle structure, and
   d. means slidably mounting said wheel and tire on said rigid cross frame for providing limited movement of the wheel and tire relative to the vehicle including,
      1. a hub removably connected to the wheel,
      2. a plate having an elongated aperture mounted on the rigid cross frame, and
      3. means movably connecting the hub to the apertured plate for movement limited to the length of the aperture,
   f. whereby, when the vehicle strikes an object in front of it the wheel and pneumatic tire are forced backward into the nesting support to absorb the resulting shock.

2. The invention as set forth in claim 1, wherein
   a. a grille is provided on the front of the vehicle, said grille being conformed on the rear periphery of the tire, and
   b. the vehicle is provided with divided bumpers about the forward corners thereof contoured to curve into the circumference of the tire.

3. The invention as set forth in claim 1, wherein
   a. the plate is rigidly mounted on the rigid cross frame,
   b. the aperture in the plate is elongated longitudinally of the vehicle, and
   c. the means for movably connecting the hub to the plate comprises a kingpin on the hub extending through the elongated aperture and secured therein for movement the length of the aperture.

4. The invention as set forth in claim 3, wherein
   a. the hub is tilted upwardly forwardly of the vehicle and the mounted wheel and tire are similarly tilted, and
   b. rearward movement of the hub in the elongated aperture results when the tire back against the nesting support.

5. The invention as set forth in claim 3, wherein
   a. a grille is provided on the front of the vehicle, said grille being conformed to the rear periphery of the tire, and
   b. the vehicle is provided with divided bumpers about the forward corners thereof contoured to curve into the circumference of the tire.

6. The invention as set forth in claim 4, wherein
   a. a grille is provided on the front of the vehicle, said grille being conformed to the rear periphery of the tire, and
   b. the vehicle is provided with divided bumpers about the forward corners thereof contoured to curve into the circumference of the tire.